United States Patent [19]
Lane, Jr. et al.

[11] Patent Number: 6,109,697
[45] Date of Patent: Aug. 29, 2000

[54] COMPACT BELT TIGHTENER

[75] Inventors: Wendell C. Lane, Jr., Romeo; Kenneth H. Kohlndorfer, Roseville; Mark F. Gray, Sterling Heights; Markell Seitzman, Orchard Lake; Jon E. Burrow, Clawson, all of Mich.

[73] Assignee: Breed Automotive Technology, Inc., Lakeland, Fla.

[21] Appl. No.: 09/026,637

[22] Filed: Feb. 20, 1998

[51] Int. Cl.[7] .................................................. B60R 21/00
[52] U.S. Cl. ........................................... 297/480; 297/464
[58] Field of Search ..................................... 297/479, 480, 297/464, 468; 280/806

[56] References Cited

U.S. PATENT DOCUMENTS

Re. 34,592  4/1994  Kawaguchi et al. .................... 280/806
4,312,521  1/1982  Thomas et al. ......................... 280/806
4,323,204  4/1982  Takada .................................... 297/479
4,549,770  10/1985 Kurtti .
5,137,226  8/1992  Fujimura et al. ....................... 280/806
5,531,479  7/1996  Bauer ..................................... 297/480

*Primary Examiner*—Milton Nelson, Jr.
*Attorney, Agent, or Firm*—Markell Seitzman

[57] ABSTRACT

A belt tightening device (100/100') for use with a safety device such as a seat belt buckle: a flexible member (12), such as an anchoring length of seat belt webbing, operatively connected to the safety device (34); a housing (102) including a first opening (110) through which the flexible member loosely extends; first and second relatively movable clamping members (160, 162) for causing a portion of the flexible member extending from the housing to be drawn into the housing thereby shortening the remaining length of the flexible member causing a safety belt operatively attached to or part of the flexible member to become more tightly disposed about a user thereof.

18 Claims, 12 Drawing Sheets

COMPACT BELT TIGHTENER

BACKGROUND AND SUMMARY OF THE INVENTION

The invention generally relates to an apparatus capable of tightening a seat belt about an occupant. These apparatuses are typically called pretensioners or belt tighteners.

During a vehicle crash event, it may be desirable to tighten the seat belt, i.e. to remove slack, about the occupant prior to the time the occupant begins to move forward. The typical prior art buckle pretensioner or belt tightener utilizes a cable secured between the buckle frame and a movable piston. Upon activation of the belt tightener, the piston is urged down a tube thereby pulling the buckle toward the vehicle floor to eliminate a predetermined amount of slack, typically 100–110 millimeters, in the seat belt relative to the occupant.

It is an object of the present invention to provide a belt tightening apparatus having a relatively small size. A further object of the present invention is to provide a belt tightener in which a flexible member such a length of seat belt webbing is drawn into the housing of the belt tightener to remove slack.

Accordingly the invention comprises: a belt tightening device for use with a safety device such as a seat belt buckle, a flexible member such as a length of seat belt webbing, operatively connected to the safety device; a housing including a first opening through which the flexible member loosely extends; a first and second relatively movable clamping members for causing a portion of the flexible member extending from the housing to be drawn into the housing thereby shortening the remaining length of the flexible member belt causing a safety belt operatively attached to or part of the flexible member to become more tightly disposed about a user thereof. More particularly, the present invention changes the shape of the flexible member from that of straight to corrugated or pleated and in so doing foreshortening an extending, adjacent section of the flexible member. Various other embodiments are described.

Many other objects and purposes of the invention will be clear from the following detailed description of the drawings.

DETAILED DESCRIPTION OF THE DRAWINGS

Figure 10:
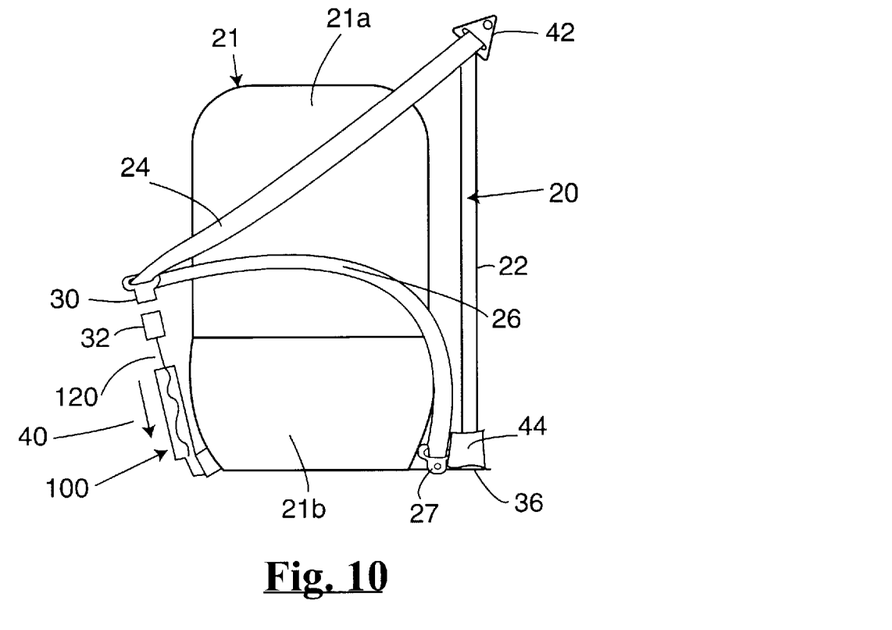
FIG. 10 illustrates a three-point safety restraint system utilizing one embodiment of the invention.

Reference is first made to FIG. 10 which illustrates a typical three-point seat belt system 20. The system comprises a seat belt 22 disposed about a vehicle seat 21 having a back 21a and cushion 21b. The seat belt is configured to include a shoulder belt portion 24 and a lap belt portion 26. The shoulder belt and lap belt portions are typically joined together at a tongue 30. These portions 24 and 26 may be physically attached to the tongue, or alternatively the tongue 30 may have a slot to permit the shoulder belt and lap belt portions to slip through the slot. This type of tongue is typically called a "slip tongue." Also diagrammatically illustrated in FIG. 10 is a seat belt buckle 32 which lockingly mates with tongue 30. The end of the lap belt 26 is secured to anchor 27 which is appropriately secured to a structural element of the vehicle such as its floor or to the seat frame. The buckle 32 is also secured to the floor or to the seat frame. As illustrated in FIG. 10, the buckle 32 is secured to a flexible strap or member 120 which may comprise a short length of the seat belt webbing material and then to a pretensioner or belt tightener which is so secured to the floor or seat.

The shoulder belt portion 24 of the belt system 20 is threaded through a D-ring or web guide of known construction generally shown as 42. These D-rings or web guides include a slot to receive the shoulder belt. The shoulder belt extends from the D-ring and is wound about a spool of an emergency locking (ELR) seat belt retractor, generally shown as 44. ELR retractors typically include a vehicle sensor and web sensor mechanisms which are used to lock the retractor to prevent protraction of the seat belt during an accident. During a typical accident, the retractor is locked to prevent seat belt protraction and the pretensioner is subsequently activated to remove slack.

Reference is made to the figures which illustrate the major components of a belt tightener 100 made in accordance with the present invention. As will be seen from the description below, the belt tightener 100 can be used in conjunction with the seat belt buckle to move the buckle in the direction (see arrow 40) to remove the slack about the seated occupant.

Figure 1:
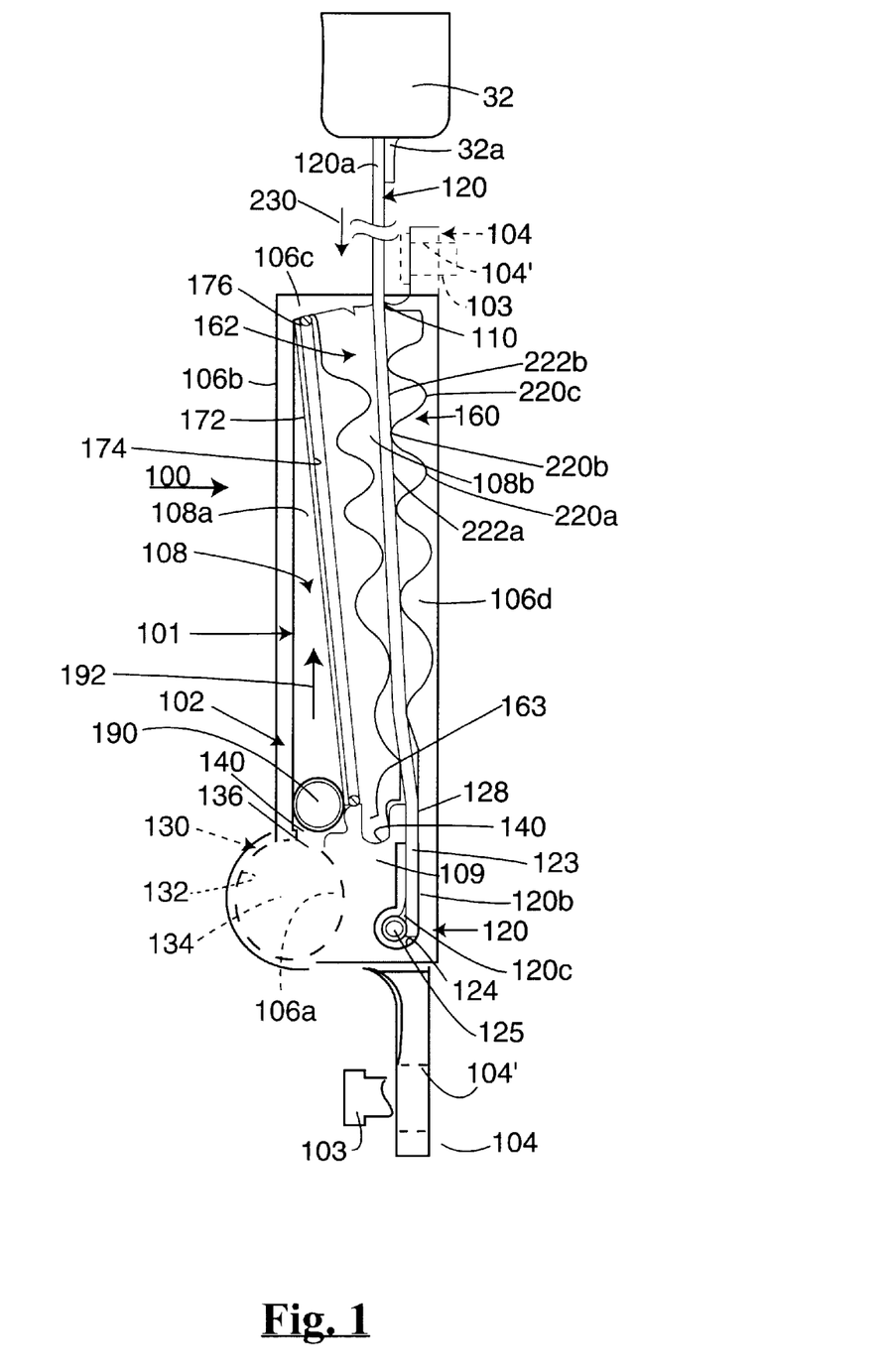
FIG. 1 illustrates a side plan view of a first housing portion and shows many of the major components of the present invention.
Figures 2, 3:
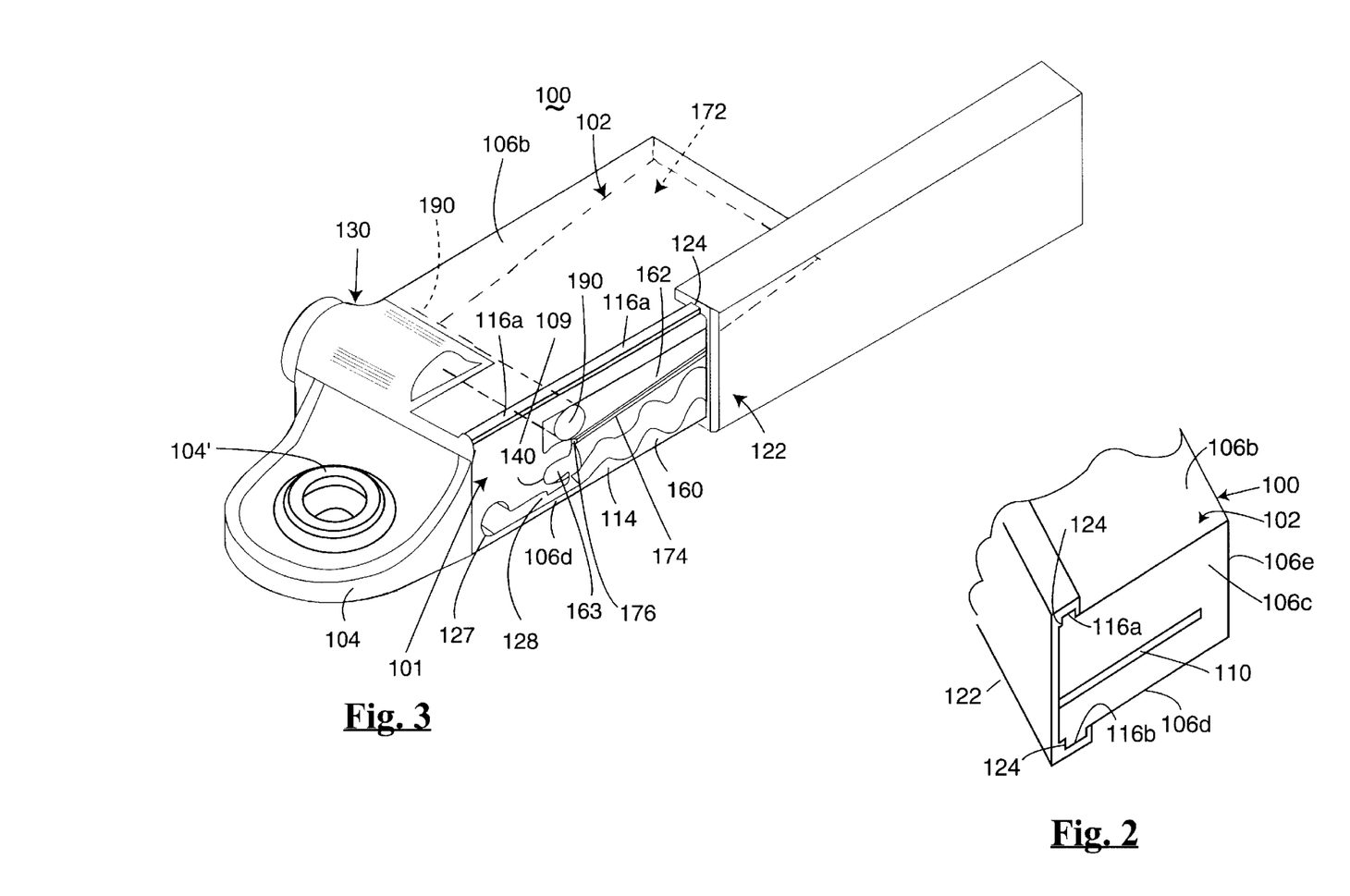
FIG. 2 is a partial end isometric view of a housing.
FIG. 3 shows a top isometric view of the first housing section with a slidable side portion partially attached.

With reference to FIGS. 1–5, the belt tightener 100 includes a housing 101 having an integral anchor portion 104 with a fastener hole 104" for receipt of a bolt 103 or similar fastener permitting the belt tightener 100 to be attached to the floor 36 or other structure of the vehicle, or alternatively to the frame of seat 21. The belt tightener 100 may additionally include a second anchor portion 104 (shown in phantom line) for receipt of a second fastener. In some applications it might be desirable to use one fastener 103 and let the tightener 100 pivot thereabout and in other applications the second anchor portion 104 and fastener 103 can be used to permanently orient the tightener in a desired orientation. The housing 101 (also see FIG. 2) additionally includes a housing block or first portion 102 and a separate side or wall (or section portion) 122. The first portion 102 includes a plurality of sides, ends or walls 106a–106e defining an interior open-sided volume 108. Housing side 106c (or top as illustrated in FIG. 1) includes a slot 110, also shown in FIG. 2, through which a flat, flexible anchor strap 120 (flexible member) extends. In the preferred embodiment of the invention, the anchor strap 120 is constructed of seat belt material, however, any flexible metal or a plastic would suffice. As also illustrated in FIG. 1, one end 120a of the strap 120 is secured to the seat belt buckle 32 typically to the buckle frame 32a and an opposite end 120b is secured within the housing portion 102. The housing portion 102 includes sides 106b and 106d which respectively include an upraised, projecting guide or rib 116a and 116b (see FIG. 2). The slidable side wall 122 includes upper and lower grooves 124 which slidingly mate with a respective one of the ribs 116a and 116b to enclose the interior, chamber or volume 108 of the first housing portion 102. As can be appreciated, when the sidewall 122 is in place, the volume 108 is sealed. A separate seal such as a gasket or O-ring can be provided if added sealing is needed. The housing parts 102 and 122 can also be welded together. The housing 101 can be made of integral construction or of a plurality of mating parts.

The side 106a of housing portion 102 includes a reinforced wall 109 immediately adjacent the volume or chamber 108. A portion of this wall 109 is formed into a cylindrical housing section 130. The housing section 130 includes a central bore 132 into which is placed a pyrotechnic element 134, which is shown in phantom line of known construction (see FIG. 1). The bore 132 is communicated via one or more passages 136 to an adjacent portion 140 of chamber 108.

The belt tightener 100 also includes a means by which end 120b of the flexible member 120 can be secured to the housing 101. The reinforced end or wall 109 of housing portion 102 includes a pin and belt-receiving cavity 127. The width of the cavity extends across the housing portion 102 and is at least slightly wider than the flexible member 120. Extending from cavity 127 is a web-receiving slot 128 (also shown in FIG. 3) through which a portion of the flexible member is placed. End 120b of the flexible member 120 is formed (such as by sewing) into a loop 120c. Sew stitches are shown as 123. A pin 125 is inserted into the looped end 120c and the pin 125 and looped end 120c are inserted into the cavity 127. A portion of the flexible member 120 adjacent the looped end 120c is slid into slot 128.

A portion of the reinforced wall 109 adjacent the slot 128 includes a groove 140 which, as related below, functions as a hinge or pivot 140.

Figure 4:
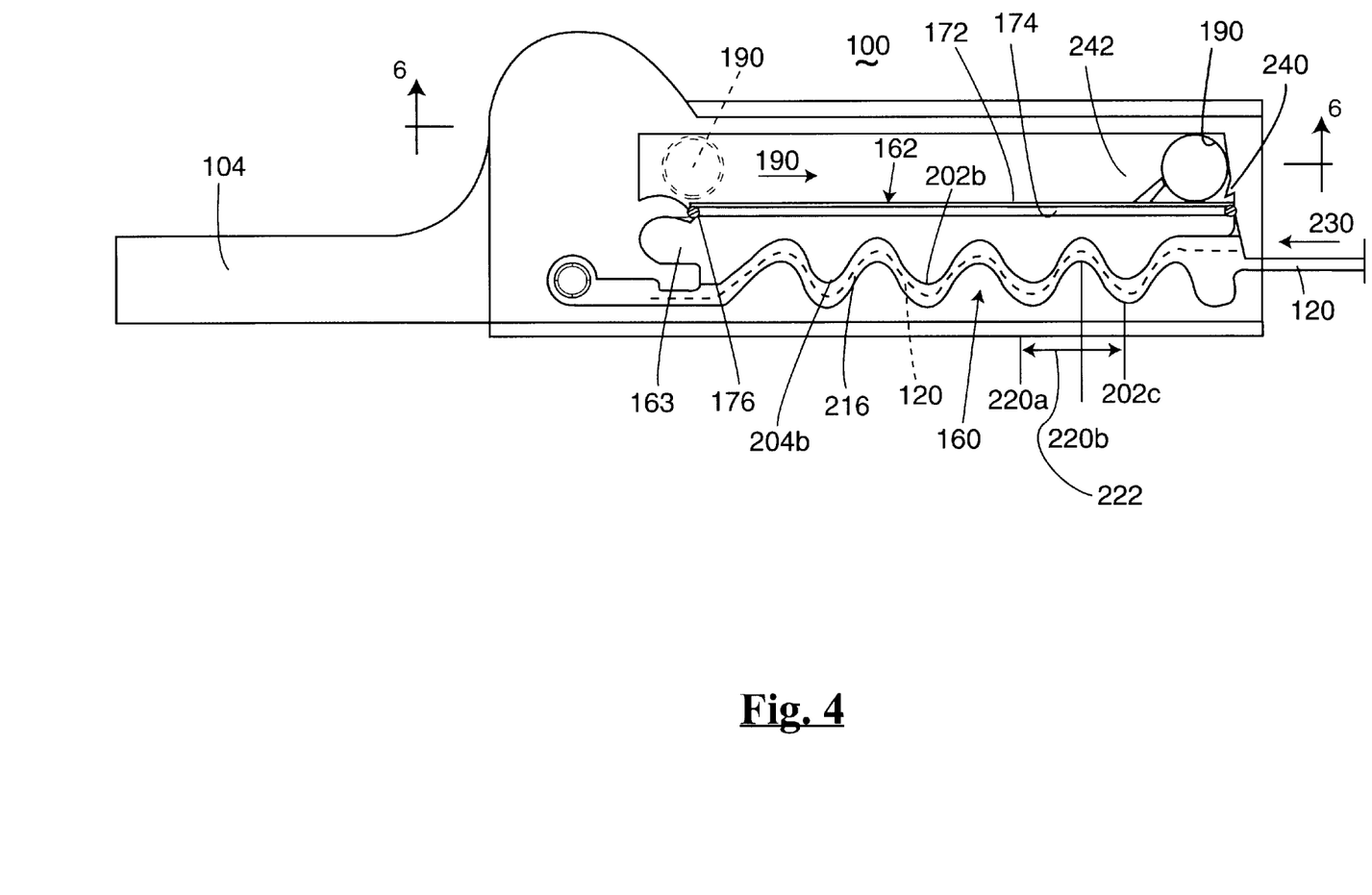
FIG. 4 is a side plan view of the first housing portion illustrating the present invention in its activated or belt-tightening mode of operation.

The housing 101 includes two clamping members 160 and 162. Clamping member 160 is formed as the top surface of the side 106d and clamping member 162 is rotatably received in hinge 140 and divides the chamber 108 into the upper portion or chamber 108a and a lower portion 108b. Clamping member 162 includes an integrally fabricated pin 163 which is received within hinge (groove) 140 enabling the clamping member 162 to pivot relative to the fixed clamping member 160. A pin or piston 190 is loosely received in chamber 108a adjacent wall 109. Pin 190 may be spotted so that it rides in guides in the housing to prevent the pin 190 from rotating. Upon activation of the pyrotechnic element 134, products of combustion are produced and communicated through passages 136 to urge the pin 190 in the direction of arrow 192. As the piston moves toward side or end 106c, it urges member 162 to pivot into a clamping position as illustrated in FIG. 4.

The member 162 includes a generally rectangular shaped upper plate portion 172 which conforms to the interior dimensions of the various walls 106a–106e. The plate 172 includes a groove 174 formed thereabout. A seal, such as an O-ring 176, is received within the groove 174 to provide a seal between the member 162 and the adjacent sides of the housing portion 102 and movable side 122 while permitting it to rotate. The O-ring is not shown in forward facing portions of the groove 174 for ease of illustration.

Figure 5:
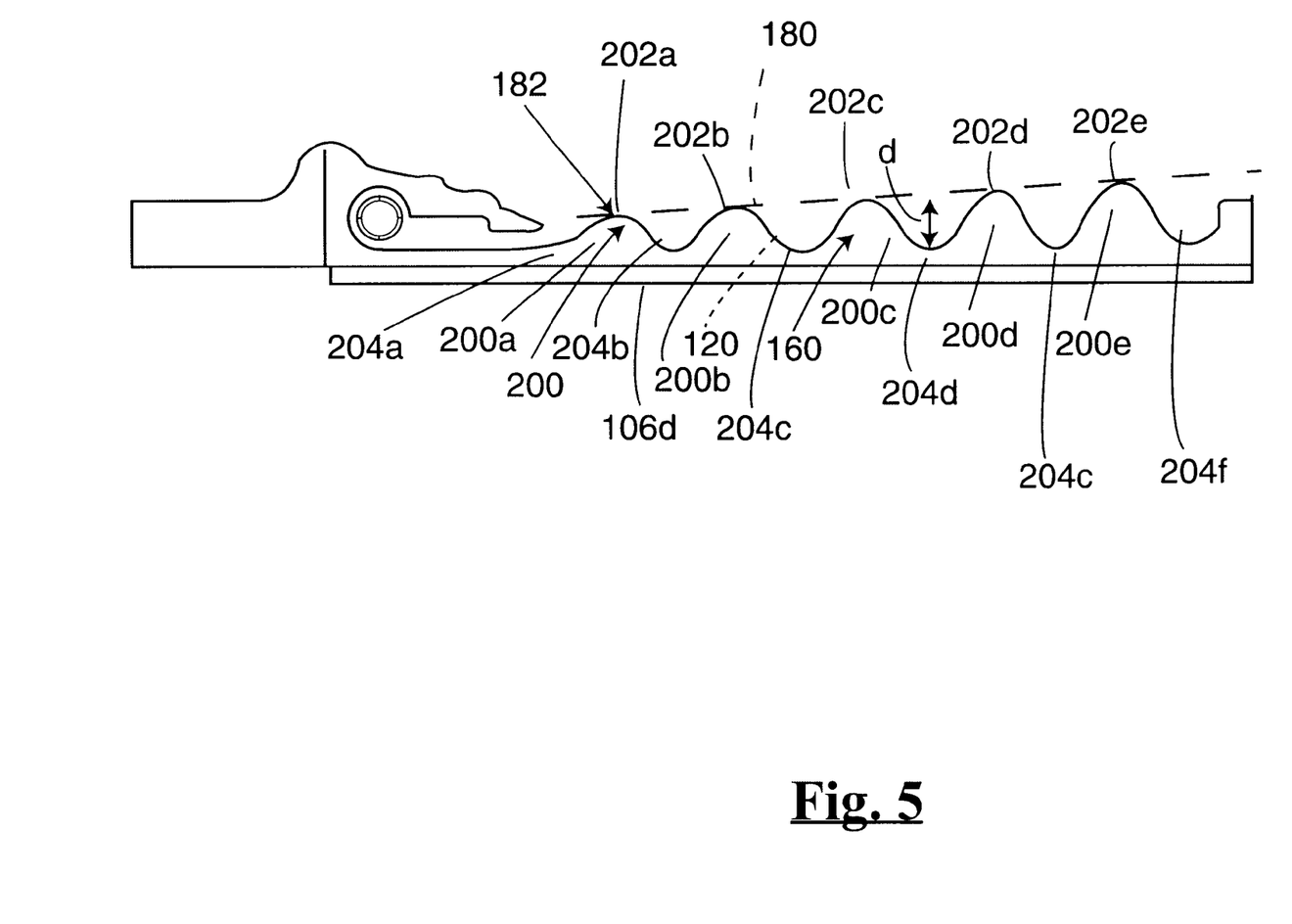
FIG. 5 is a partial side plan view of a lower clamp member.
Figure 6:
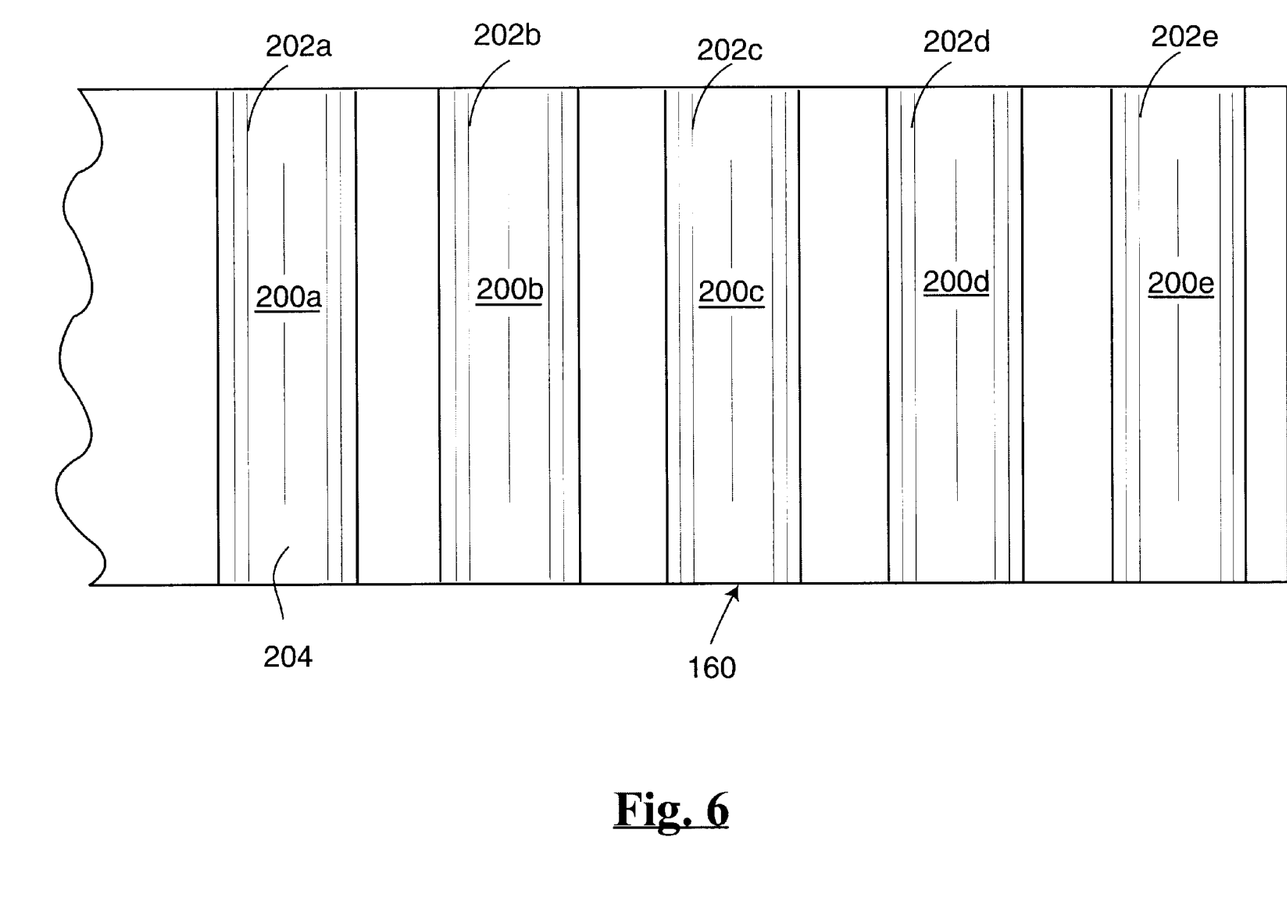
FIG. 6 is a partial top plan view of the lower clamp member.

Reference is again briefly made to FIG. 1. As can be seen, the anchor strap (flexible member) 120, prior to activation of the belt tightener 100, is positioned between the two clamping members 160 and 162 and extends generally flat or straight through the housing 101. Reference is also made to FIG. 5 which shows a partial side plan view of the lower clamp 160. While not fully apparent from FIGS. 1 and 4 the lower clamp 160 is wedge shaped. Phantom line 180 illustrates this wedge-shaped profile and in essence defines a top surface 182 of the clamp 160. Clamp 160 includes a plurality of undulating features 200 such as features 200a–e. Adjacent peaks of these features, such as peaks 202a–e, lie on the sloped profile shown by line 180. Adjacent each peak 202a–e is a corresponding groove or valley 204, such as 204a–f. The depth, d, of each adjacent groove 204 relative to the sloped profile 180 increases in the direction of side 106c. These grooves 204 extend across the width of side 106d, as illustrated in FIG. 6, which is a partial top plan view of the top surface 182 of clamp 160.

As can be seen from the above figures each groove 204a–f, in relation to the top surface 182, is sinusoidal in nature. Other configurations such as described below are within the scope of the present invention.

Figure 7:
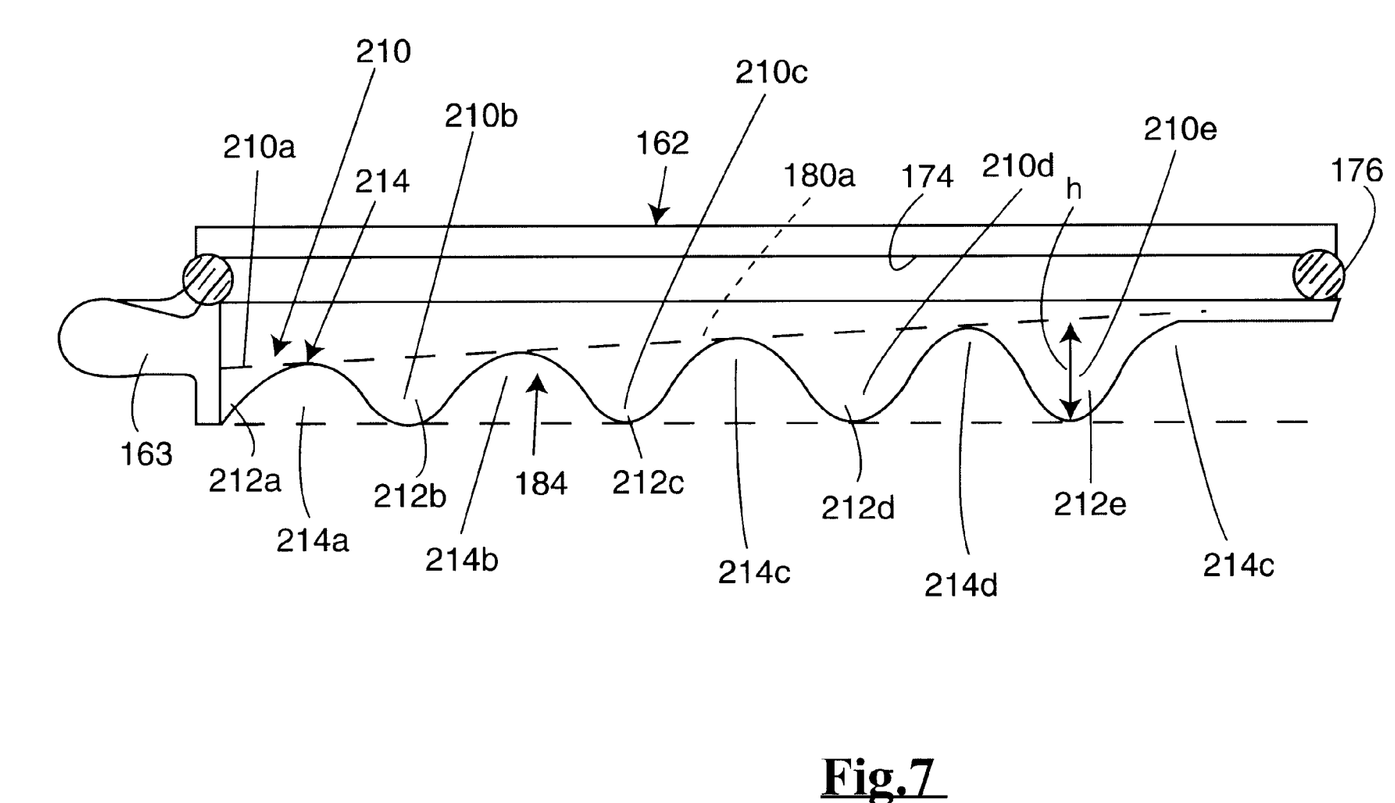
FIG. 7 is a side plan view of an upper clamp member.

Reference is briefly made to FIG. 7 which illustrates a side plan view of the upper clamp 162. The lower clamping surface 184 of this clamp 162 includes a plurality of mating undulating features 210 such as 210a–e. These features define a plurality of peaks 212a–e and a corresponding plurality of grooves or valleys 214 such as 214a–e. These features 210, 212 and 214 extend across the width of the upper clamp 162. The most inner portion of each groove 214 lies on a sloped profile 180a having a slope equal to that of profile 180. The height, h, of each peak 212 relative to the profile 180a increases toward the end or side 106c of the housing 101.

When the upper clamp 162 is moved into a belt tightening configuration, as shown in FIG. 4, relative to clamp 160 the two sets of undulating features 200 and 210 interfit with each other and are spaced apart from one another. The space between the clamps 160 and 162 is shown as 216 (see FIG. 4) which is sufficient to receive the flexible member 120 (also shown in phantom line in FIG. 4).

As member 162 is rotated toward member 160, undulating, opposing features 200 and 210 on the lower and upper clamp members 160 and 162 are brought into a belt tightening configuration with each other causing the previously straight flexible member 120 (as shown in FIG. 1) to be pressed upon the undulations 200a, 200b, 200c, etc. As can be seen, the linear distance traveled along each undulating feature 200, such as the distance between points 220a to 220b to 200c, is longer than the straight line distance between corresponding points 222a and 222c on the flat, straight, unclamped flexible member 120 as shown on FIG. 1. Consequently, as the two clamping members 160 and 162 move together (and with end 120c of the strap 120 secured by a pin 125 and loop 120c within a receiving cavity 124) the configuration of the flexible member 120 becomes pleated or corrugated and the flexible member 120 will be drawn into the housing 102 in the direction of arrow 230 as it conforms to the surface profile of the first set of undulations 200a. As the piston 190 continues to move toward end 106c, the clamping member 162 continues to be rotated thereby causing the strap 120 to lay flat across the linear surface of the next adjacent feature 200b and so on. This action draws additional lengths of the strap (flexible member) 120 into the housing. The flexible member 120 is sequentially or serially caused to lay upon and follow the surface profile of each undulating feature 200b, 200c, 200d, 200e drawing additional lengths of the flexible member 120 into the housing such that upon complete activation of the piston 190 and rotation of the clamping member 162, approximately 100–120 millimeters of the strap 120 have been drawn into the housing 102. This distance corresponds to the increased distance as measured along the undulations. As the flexible member 120 is drawn into the housing, the buckle 34 is similarly drawn downward to tighten the belt 22 about the occupant. As can be appreciated, the number, size and position of the undulations can be modified to change the amount to material drawn into the housing 101.

As can be seen from the description below, the interdigitated, undulating surfaces provide a mechanical advantage in regard to the movement of the flexible member 120 such that the size of the housing 102 can be significantly smaller than the total amount (linear length) of the flexible member 120 (i.e. the seat belt) drawn into the housing. The orientation of the flexible member is changed from that of a straight configuration to that of a corrugated or pleated configuration.

Reference is briefly made to FIG. 4 which illustrates an additional feature of the present invention. The interior of the side or wall 106c is optionally constructed with a locking feature generally shown as 240 which would prohibit any tendency of the member 162 from moving or rotating upwardly so as to release its clamp upon the flexible member 120 and permit the flexible member to be pulled out of the housing as the occupant loads the seat belt 22 (lap belt 26 or shoulder belt 24) during the accident. The locking feature 220 can be a flexible tab or a ball lock or wedge. This locking feature may alternately be realized by utilizing fingers or tabs such as 242 fabricated as part of member 162 which will retain the pin 190 in its completely activated position in the right hand portion of the upper chamber 140.

The operation of the belt tightener 100 is summarized below. During an emergency, the seat belt retractor 44 will lock thereby preventing further protraction of the shoulder belt 24. The locking of the retractor 44 will prohibit the shoulder belt from sliding through the D-ring 42. Upon activation of the pyrotechnic charge 134 or alternately actuator 250 (shown in phantom line in FIG. 12) the clamp members 160 and 162 are pushed together thereby causing that portion of the flexible member 120 adjacent the housing 101 to be drawn into the housing of the belt tightener 100 thereby reducing the slack, in the shoulder belt 24, about the upper torso of the occupant. The belt tightener 100 can be activated before, with or after the locking of the retractor. If the occupant has begun to load the seat belt system 20 prior to the activation of the belt tightener 100, tensile loads are communicated to the buckle 32 which will cause the flexible member 120 to be pulled taut. Under these circumstances the clamping forces acting on the clamp member 162 must be sufficient to act against the loaded flexible member.

Figure 8:
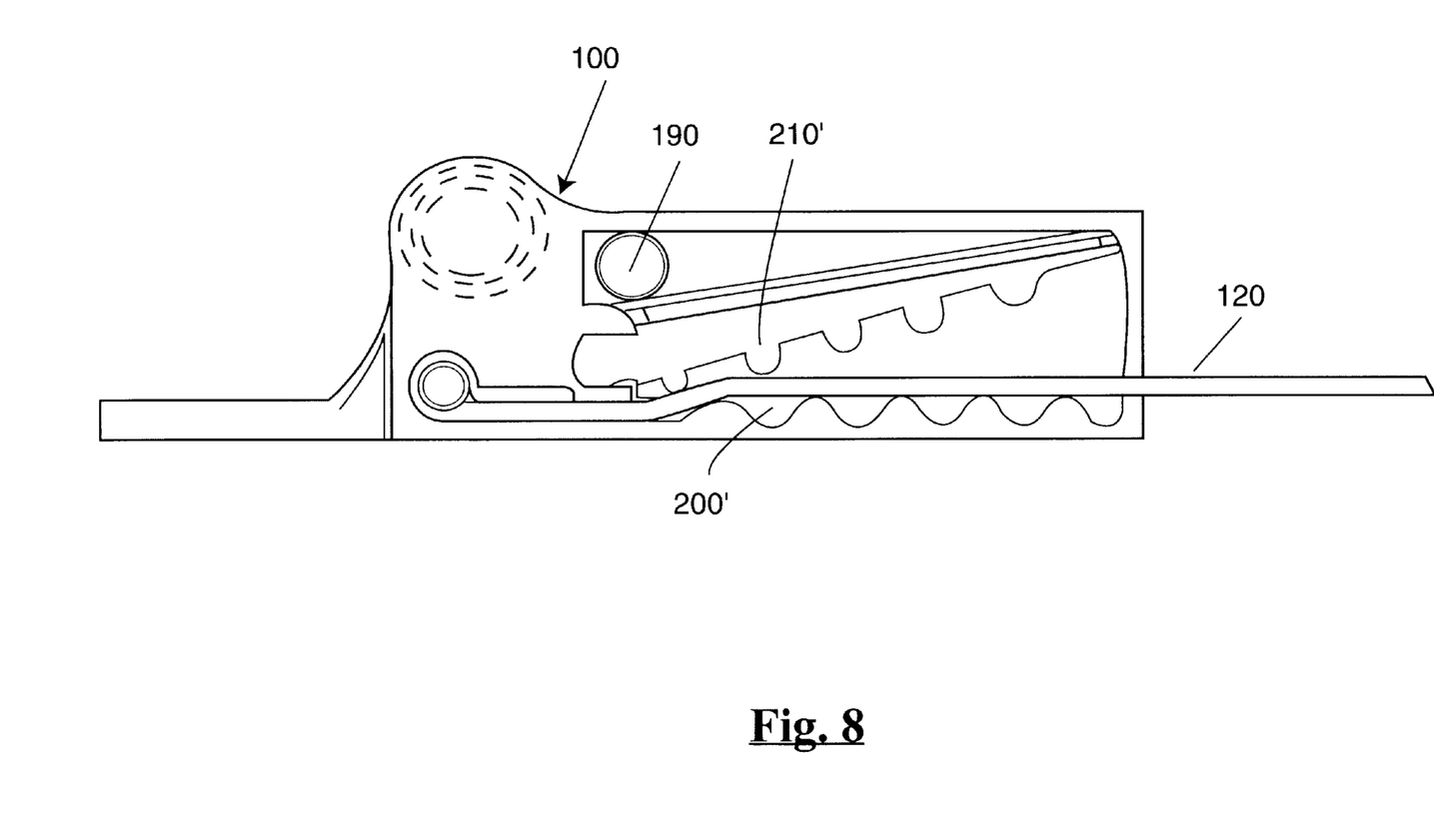
FIG. 8 illustrates an alternate embodiment of the invention.

Reference is briefly made to FIG. 8 which shows alternate configurations of the respective mating undulating features 200' and 210' of the lower and upper clamping members.

Figure 9:
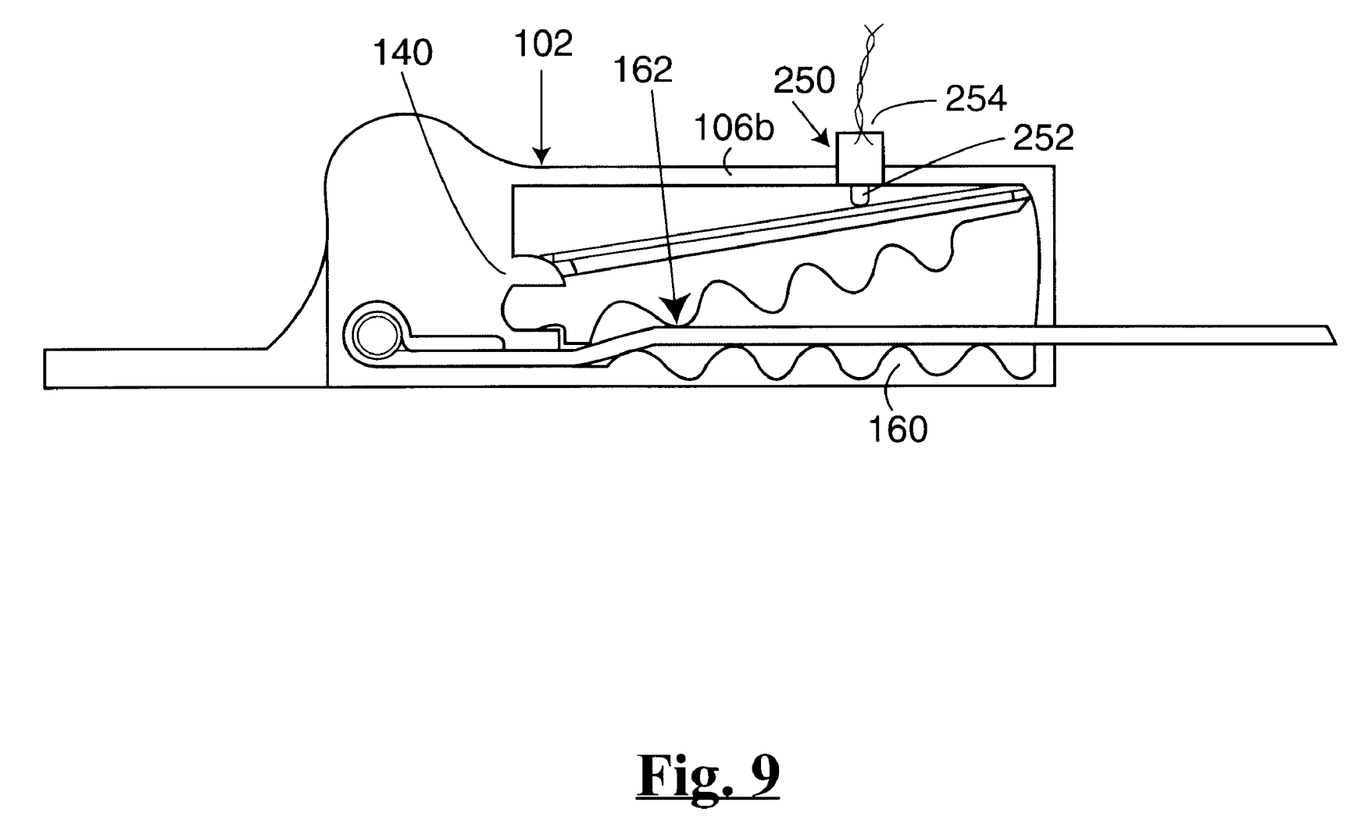
FIG. 9 shows another embodiment of the invention.

Reference is briefly made to FIG. 9 which illustrates a further embodiment of the invention.

In this embodiment the piston 190 and pyrotechnic unit 134 (located in the reinforced wall 109) have been removed and replaced with an actuator 250 located on the side 106b of the housing portion 102 at a given distance from the hinge 140. The actuator includes an extendible piston 252 which in its inactive state rests upon the plate 172. The actuator 250 can be located at any location on side 106b. As can appreciated, the required length that the piston 252 must extend to place the upper clamp member 162 in its belt-tightening configuration will vary with the mounting location. The actuator 250 may be a pyrotechnic device or an electrical solenoid which is responsive to a control signal generated by a control unit in response to a crash signal generated by sensors located within the vehicle. Upon activation the piston 252 extends outwardly from the body 254 of the actuator 250 forcing the clamping member 162 to rotate about hinge 140 into its belt tightening position such as shown in FIG. 4. The actuator 250 may also include a physical stop or latching mechanism which will prevent the piston 252 from reentering the housing 254 thereby maintaining the upper clamp member 162 in its belt tightening position. This stop could be used to replace stop 240.

Figure 11:
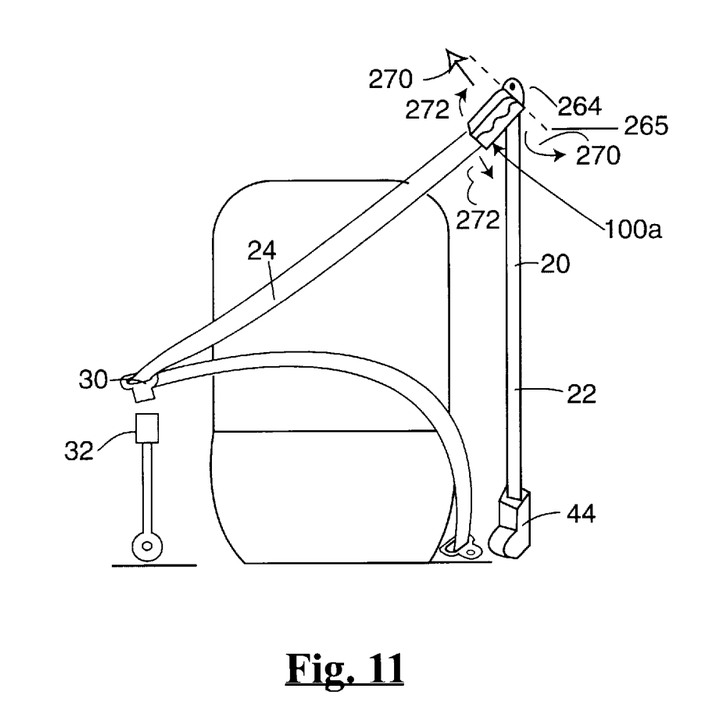
FIGS. 11 and 12 show another embodiment of the invention.
Figure 12:
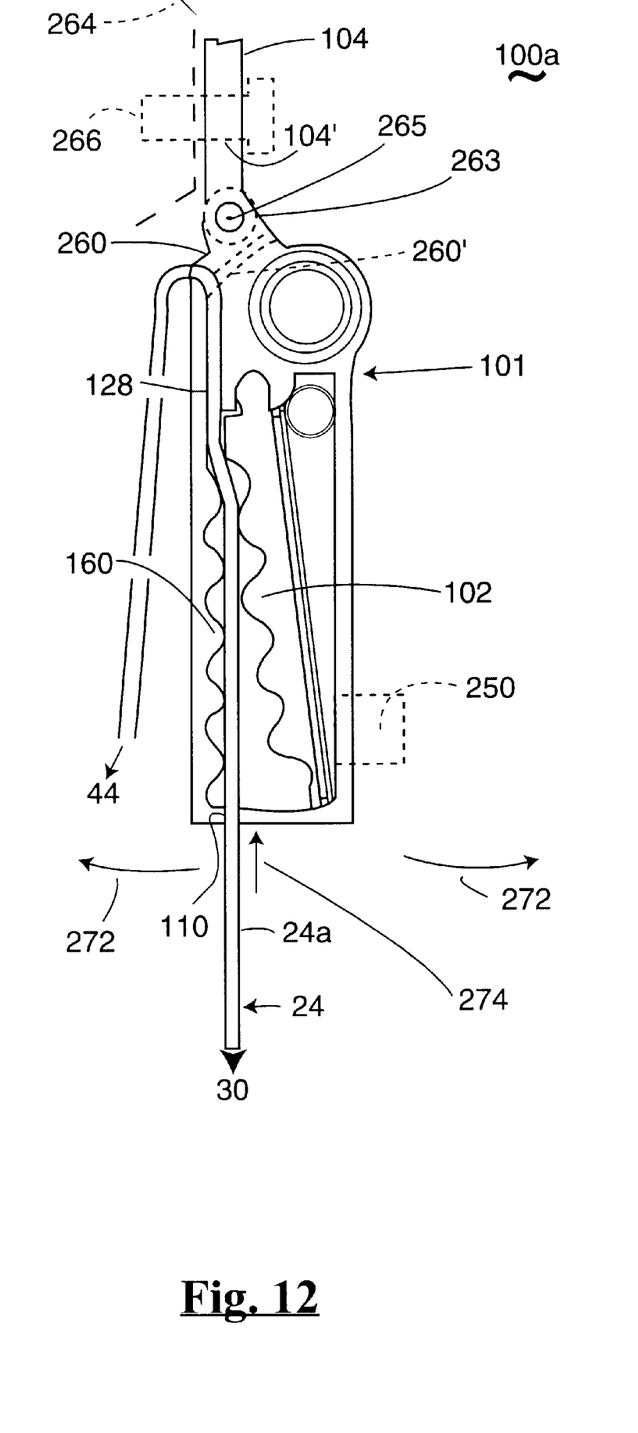

Reference is briefly made to FIGS. 11 and 12 which illustrate an alternate belt tightener 10a usable as a D-ring or web guide. In this embodiment, the flexible member 120 referred to above is the shoulder belt portion 24 of the seat belt 22. The buckle 32 is fixedly connected to the vehicle via a known type of strap. As can be seen in FIG. 12, pin 124 and looped end 120c of the flexible member have been removed from the belt tightener 100a. The housing portion 102 additionally includes an arcuate slot 260 which extends from slot 128 in the housing portion 102. The belt tightener/web guide of FIGS. 11 and 12 is secured to an adjacent pillar of the vehicle such as the B-pillar or C-pillar generally shown as 264 by a fastener 266. Fastener 266 is loosely received in opening 104' in the anchor portion 104 to enable the belt tightening D-ring 100a to rotate side-to-side (see arrows 270 of FIG. 11). The anchor 104, of this embodiment may optionally be connected to housing 101 via a hinge 263 thereby also permitting the housing 101 to rotate (up and down, see arrows 272) about a hinge axis 265. The shoulder belt 24 is threaded through slots 260 and 128 of the belt tightener 100a and also placed between the clamping members 160 and 162. One end of the shoulder belt 24 is received onto the retractor 44 while the other end is operatively connected to the tongue 30 in a known manner.

The operation of the belt tightener 100a is very much the same as that illustrated above. During an emergency, the seat belt retractor 44 will lock thereby preventing further protraction of the shoulder belt 24. The locking of the retractor 44 will prohibit the shoulder belt from sliding through slots 260 and 128 of the belt tightening D-ring 100a. This action is analogous to the function achieved by the webbing pin 125. Upon activation of the pyrotechnic charge 134 or alternately actuator 250 (shown in phantom line in FIG. 12 to illustrate that alternate actuation techniques can also be employed in tightener 100a) the clamp members 160 and 162 are pushed together thereby causing that portion of the shoulder belt designated by numeral 24a to be drawn upwardly (see arrow 274) into the housing of the belt tightener 100' thereby reducing the slack, in the shoulder belt 24, about the upper torso of the occupant.

Figure 13:
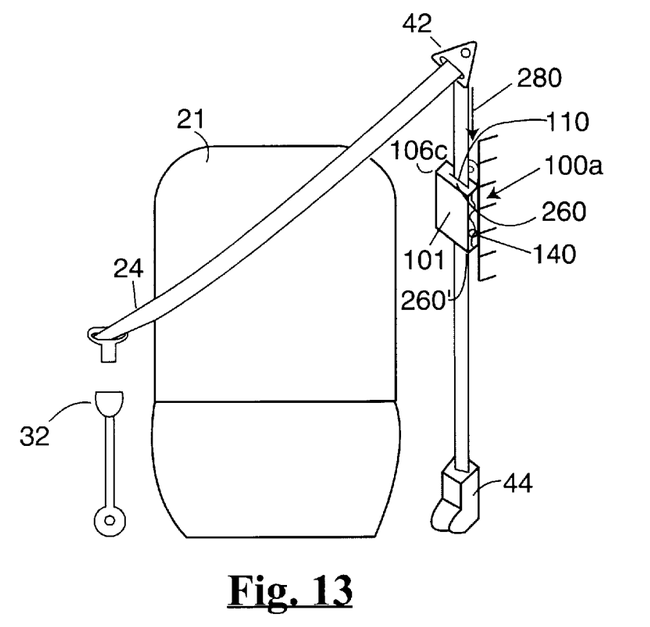
FIGS. 13 and 14 show two additional embodiments of the invention.
Figure 14:
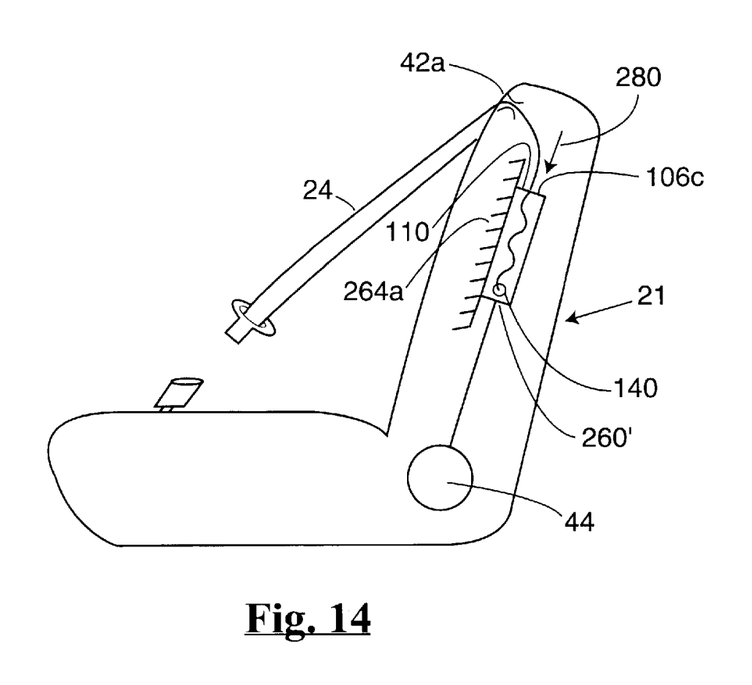

Reference is briefly made to FIG. 13 which shows another three-point safety belt system 20. In addition, FIG. 13 illustrates the belt tightener 100a secured to a structural component 264 of the vehicle such as the B or C-pillar. The belt tightener is positioned between the D-ring 42 and the retractor 44. In this embodiment the housing 101 includes an additional slot 260' located near side 106a. The shoulder belt extends through slots 110 and 260'. Upon the locking of the retractor 44 and the activation of the belt tightener 100, the clamp member 162 will be moved about pivot 140 drawing the shoulder belt portion 24 downwardly (see arrow 280) into the housing 101 thereby tightening the belt about a seated occupant. FIG. 14 shows a similar configuration with the belt tightener 100 secured to a structural member 264a such a part of the frame of the seat 21. As is common with seat-integrated seat belt systems, the shoulder belt portion 24 exits the seat through a slot 42a which functions as a web guide. Upon the locking of the retractor 44 and the activation of the belt tightener 100, the clamp member 162 will be moved about pivot 140 drawing the shoulder belt portion 24 downwardly (see arrow 280) into the housing 101 thereby tightening the belt about a seated occupant.

Figure 15:
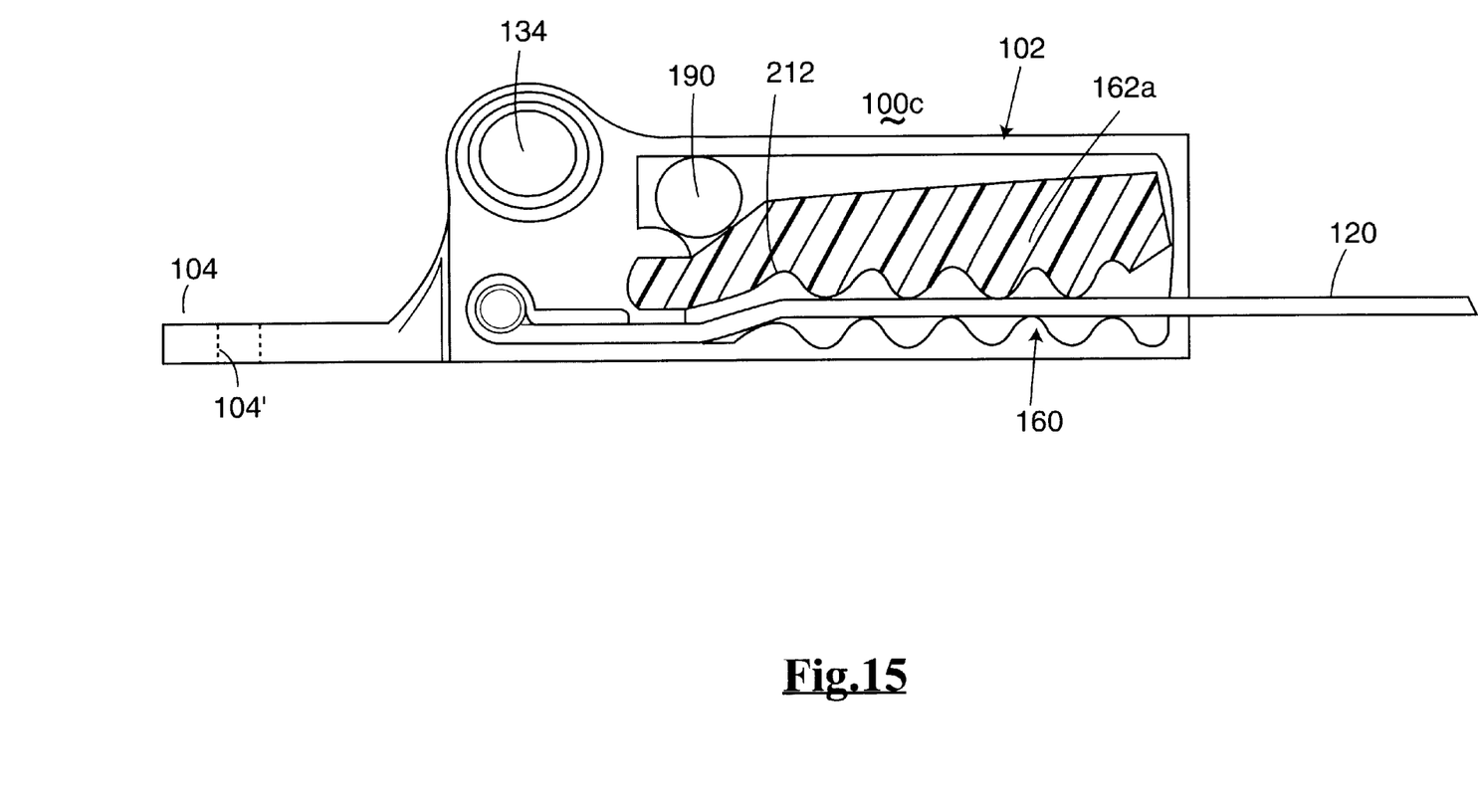
FIG. 15 shows a further embodiment of the invention utilizing a flexible upper clamp member.

Reference is briefly made to FIG. 15 which illustrates yet another embodiment of the invention. The belt tightener shown in FIG. 15 is identical to that of FIG. 1 but permits each of the respective undulating features 210 (210a-6) to articulate relative to an adjacent feature. As illustrated, the clamp member 162, rather than being fabricated using a relatively inflexible material such as steel, is fabricated using a bendable block of plastic such as Nylon or hardened rubber shown as 162a.

Many changes and modifications in the above-described embodiment of the invention can, of course, be carried out without departing from the scope thereof. Accordingly, that scope is intended to be limited only by the scope of the appended claims.

We claim:

1. A belt tightening device (100/100') for use with a seat belt safety system, the system including a safety device (32), the belt tightening device comprising:

a flexible member (12) adapted to be operatively connected to the safety device (32);

a housing (102) including a first opening (110) through which the flexible member loosely extends;

first means (160, 162), activated during an emergency, for forming the flexible member into a tortuous configuration and in so doing for causing a portion of the flexible member, which extends from the housing, to be drawn into the housing thereby shortening an extending length of the flexible member causing the safety belt system to become more tightly disposed about a user thereof.

2. The device as defined in claim 1 wherein the flexible member is a length of seat belt webbing.

3. The device as defined in claim 1 wherein the housing is enclosed except for the first opening through which the flexible member extends.

4. The device as defined in claim 1 wherein the flexible member extends out from slots proximate opposing ends of the housing.

5. The device as defined in claim 1 wherein the first means (160, 162) includes:

securing means (44, 125, 120c) for preventing a first portion of the flexible member against sliding relative to the housing and clamping means (160, 162) for causing an adjacent portion of the flexible member to be sequentially moved toward the secured first portion so as to be drawn into the housing.

6. The device as defined in claim 5 wherein the securing means includes a looped end of the flexible member and a pin received through the loop, the pin fixedly secured within the housing to secure the first portion in place.

7. The device as defined in claim 5 wherein the clamping means includes two facing relatively movable clamp members movable from a non-activated position to a tightening configuration in response to movement of a forcing member (190, 250, 252), wherein the clamp members are first moved into the tightening configuration relative to a first portion of the flexible member located proximate the securing means and subsequently moved into a tightening configuration with other portions of the flexible member which extend from the first portion, and adjacent portion of the flexible member are drawn into the housing.

8. The device as defined in claim 5 wherein the clamping means includes a fixed first clamp member and a movable second clamp member.

9. The device as defined in claim 8 wherein the second clamp member is articulated relative to the first clamp member.

10. The device as defined in claim 1 wherein the safety device includes a seat belt buckle and wherein at least a first end of the housing is operatively connected to a fixed location and wherein the flexible member extending from the housing is attached to the seat belt buckle wherein upon activation of the device the buckle is moved and a seat belt attached thereto is brought more tightly about a user.

11. The device as defined in claim 1 wherein the first means includes first and second clamp members having corrugated or undulating surfaces arranged to clamp the flexible member therebetween whilst simultaneously drawing adjacent portions of the flexible member into the housing.

12. The device as defined in claim 10 further including a forcing member for moving the first and second clamp members together.

13. The device as defined in claim 12 wherein the forcing member is a pin (190) slidably movable between the second clamp member and a portion of the housing (102).

14. The device as defined in claim 13 including a pyrotechnic element positioned upstream of the pin for generating products of combustion which act upon the pin.

15. The device as defined in claim 12 wherein the first clamp member (162a) is flexible and deformable by the forcing pin (190) as the pin is moved across a mating surface of the first clamp member to serially place mating undulating features of the first and second clamp members in their belt tightening configuration thereby drawing the flexible member into the housing.

16. A belt tightening device (100/100') for use with a safety device, the belt tightening device comprising:

a flexible member (12) adapted to be operatively connected to the safety device (34);

a housing (102) including a first opening (110) through which the flexible member extends in a generally straight configuration;

first means (160, 162) for forming pleats in the previously straight flexible member and in so doing drawing an adjacent portion of the flexible member into the housing thereby shortening the remaining length of the flexible member.

17. The device as defined in claim 16 wherein the first means includes first and second clamp members having corrugated or undulating surfaces arranged to clamp the flexible member therebetween whilst simultaneously drawing adjacent portions of the flexible member into the housing.

18. The device as defined in claim 16 wherein the safety device includes a seat belt buckle and wherein at least a first end of the housing is operatively connected to a fixed location and wherein the flexible member extending from the housing is adapted to be attached to the seat belt buckle wherein upon activation of the device the buckle is moved and a seat belt attached thereto is brought more tightly about a user.

* * * * *